United States Patent [15] 3,649,329
Taubner et al. [45] Mar. 14, 1972

[54] PHOSPHOR COATING FOR ARC DISCHARGE LAMPS

[72] Inventors: Fred R. Taubner, Danvers, Mass.; Charles F. Chenot, Towanda, Pa.

[73] Assignee: Sylvania Electric Products Inc.

[22] Filed: June 30, 1969

[21] Appl. No.: 837,939

[52] U.S. Cl. .................................. 117/33.5 L, 252/301.3
[51] Int. Cl. .................................................. H01k 1/28
[58] Field of Search ............ 252/301.3; 117/33.5 R, 33.5 E, 117/33.5 CM, 33.5 L; 96/36.1

[56] References Cited

UNITED STATES PATENTS

| | | | |
|---|---|---|---|
| 2,318,060 | 5/1943 | Cortese | 117/33.5 |
| 2,647,066 | 7/1953 | Homer | 117/33.5 |
| 2,686,158 | 8/1954 | Jones | 117/33.5 X |
| 3,342,594 | 9/1967 | Kaplan | 96/36.1 |

*Primary Examiner*—Alfred L. Leavitt
*Assistant Examiner*—Wayne F. Cyron
*Attorney*—Norman J. O'Malley and James Theodosopoulos

[57] ABSTRACT

A small quantity of benzoic acid is added to a phosphor coating suspension in order to prevent a loss in brightness of lamps made therefrom.

7 Claims, No Drawings

PHOSPHOR COATING FOR ARC DISCHARGE LAMPS

BACKGROUND OF THE INVENTION

1. Field of the Invention

This invention relates generally to arc discharge lamps and particularly to phosphor coatings used in such lamps.

2. Description of the Prior Art

In the manufacture of arc discharge lamps having a phosphor on the inner wall of the lamp bulb, the phosphor is generally deposited on the bulb from a suspension of the powdered phosphor in a suitable liquid vehicle. For example, in the manufacture of a fluorescent lamp, the open-ended lamp bulb is positioned vertically and the phosphor suspension is introduced into the top end of the bulb and caused to flow down the entire inner surface thereof. A sufficient amount of the suspension adheres to the inner wall to form a uniform layer of wet phosphor thereon. The solvents are then evaporated and the phosphor coated bulb is then stored until it can be processed into a finished fluorescent lamp. The duration of storage time of coated bulbs prior to processing depends on exhaust machine production schedules in addition to other manufacturing requirements and can vary from about one-half hour to 16 hours or even more. Normally, the length of storage time has little effect on the luminescent properties of finished fluorescent lamps.

However, in some phosphor suspensions, aliphatic amines are added for the purpose of stabilizing the suspension by promoting the dispersion of the phosphor particles. The use of these amines results in a phosphor coating that is very reactive with acidic atmospheric gases, particularly sulphur dioxide gas. A reaction therebetween can occur when the concentration of this gas in the atmosphere is as low as 0.05 to 0.10 parts per million, such a concentration being frequently exceeded in the atmosphere of the storage area of phosphor coated bulbs.

The reaction between the amine dispersant and the sulphur dioxide produces a material that will not completely burn off during lamp baking processes. As a result the brightness of fluorescent lamps made therefrom is decreased, and the amount of decrease is generally proportional to the degree of sulphur dioxide contamination of the phosphor. In extreme cases the decrease in brightness is as high as fifty percent after only a few hundred hours of lamp operation.

SUMMARY OF THE INVENTION

We have discovered that the reaction between an amine dispersant of a phosphor coating and sulfur dioxide can be inhibited by the addition of a small quantity of benzoic acid to the coating suspension. The benzoic acid can be premixed with the amine prior to formulating the phosphor coating suspension or it can be added to the prepared phosphor coating suspension containing the amine. However, the benzoic acid should not be allowed to come into contact with the phosphor suspension before the amine has been added in order to be effective in inhibiting the sulphur dioxide-amine reaction.

The deleterious effects of sulphur dioxide on fluorescent phosphor coated bulbs and on the corresponding light output depreciation of lamps made therefrom are reduced in proportion to the amount of benzoic acid addition, with substantially no brightness loss occurring at optimum benzoic acid concentrations.

An additional advantage resulting from the combination of benzoic acid with an amine dispersant in a phosphor coating suspension is a reduction in the amount of phosphor required to obtain the optimum thickness of phosphor coating on the bulb wall. This decrease in the amount of phosphor results in a three to four percent savings in phosphor material costs, which is substantial since the phosphor is one of the most expensive material components of a fluorescent lamp.

In addition to inhibiting the sulphur dioxide-amine reaction and reducing the phosphor weight per lamp, the benzoic acid in combination with the amine also improves the physical appearance of the bulb phosphor coating by giving a smoother texture thereto in comparison to a coating that does not contain benzoic acid.

Preferably the amount of benzoic acid that is added to a phosphor suspension is about equal to the weight percentage of the amine dispersant in the suspension, and is less than about 1 or 2 percent of the weight of the phosphor.

DESCRIPTION OF THE PREFERRED EMBODIMENT

A phosphor coating suspension in accordance with this invention comprised a calcium halophosphate phosphor activated by antimony and manganese. The phosphor coating suspension was prepared by dispersing the phosphor particles in an organic system consisting of ethyl cellulose as a binder, xylol and butanol as solvents, and dibutyl phthalate as a plasticizer. The suspension was stabilized by the addition of a primary aliphatic amine in the amount of 0.75 percent by weight of the phosphor. The same amount of benzoic acid, 0.75 percent by weight of the phosphor, was then added in order to render the amine non-reactive to the gaseous sulphur dioxide in the atmosphere.

The phosphor suspension was applied in the usual manner of causing the suspension to flow down the inner surface of the bulb and allowing sufficient time for the solvents to evaporate, leaving the ethyl cellulose, dibutyl phthalate, amine-benzoic acid combination and phosphor particles adhered to the dried bulb.

Control lamp bulbs were phosphor coated by the same procedure except that the benzoic acid was omitted from the coating suspension.

Both groups of bulbs, that is, those containing the benzoic acid additive and the control without benzoic acid, were subjected to an atmosphere which contained a concentration of from 1 to 2 parts per million of sulphur dioxide gas for a period of 1 hour.

The bulbs were than baked in a lehr in the usual manner at a temperature of about 600° C. for about two minutes in order to burn off the organic components, leaving the phosphor particles adhered to the inner surface of the bulb walls. After baking, the bulbs were processed into fluorescent lamps by the usual lamp manufacturing techniques, and were then photometered for light output in a standard photometric sphere. After subsequent hundred hour operating intervals, the lamps were again photometered in order to compare the lamp brightness of the benzoic acid lamps with the lamps which did not have benzoic acid in the phosphor coating.

The photometric results expressed in lumen units of light output showed 3166 lumens after operating 100 hours for the lamps containing benzoic acid in the coating that was exposed to sulphur dioxide gas. The lamps which did not contain benzoic acid in the phosphor coating but which were also exposed to sulphur dioxide gas measured 1691 lumens after operating 100 hours. These results show that the presence of a small quantity of benzoic acid renders the phosphor coating which contains the amine stabilizing agent non-reactive to an atmosphere containing sulphur dioxide contamination.

Several concentrations of benzoic acid additions to the phosphor coating suspension were evaluated in the same manner and the results of 40 watt lamps made therefrom are listed in Table I. In each case the weight of amine dispersant in the coating suspension was 0.75 percent of the phosphor weight, the phosphor being a cool white calcium halophosphate. The lamps designated as "B" were those in which the coated bulbs had been exposed to sulphur dioxide and the lamps designated as "A" were controls which had not been exposed to sulphur dioxide. The benzoic acid is expressed as a percentage of the weight of the phosphor in the suspension.

TABLE I

| Test No. | Coating Suspension | Lumens 100 hrs. | 200 hrs. |
| --- | --- | --- | --- |

| | | | |
|---|---|---|---|
| 1. Lamp A | no benzoic acid | 3,180 | 3,152 |
| Lamp B | no benzoic acid | 1,691 | 1,717 |
| 2. Lamp A | 0.15% benzoic acid | 3,182 | 3,136 |
| Lamp B | 0.15% benzoic acid | 2,057 | 2,078 |
| 3. Lamp A | 0.375% benzoic acid | 3,169 | 3,150 |
| Lamp B | 0.375% benzoic acid | 2,980 | 2,956 |
| 4. Lamp A | 0.50% benzoic acid | 3,181 | 3,164 |
| Lamp B | 0.50% benzoic acid | 3,105 | 3,088 |
| 5. Lamp A | 0.75% benzoic acid | 3,176 | 3,153 |
| Lamp B | 0.75% benzoic acid | 3,166 | 3,152 |

It can be seen from test No. 1 in Table I that without benzoic acid in the coating suspension, sulphur dioxide exposure reduced lamp brightness by 47% after 100 hours of lamp operation and 46 percent after 200 hours. In test No. 2, where the concentration of benzoic acid was only one-fifth that of the amine dispersant, the same brightness reduction was only 35 percent and 34 percent respectively. And in test No. 5, where the concentration of benzoic acid equalled that of the amine, there was no significant brightness reduction resulting from exposure of the coated bulb to sulphur dioxide.

It is likely that some benzoic acid derivatives may also be effective in inhibiting the reaction between an amine dispersant and sulfur dioxide without impairing the effectiveness of a phosphor suspension. For example, benzoic acid anhydride does inhibit the reaction. But the texture of a phosphor layer deposited from a phosphor suspension containing the anhydride is not as smooth as that obtained from the benzoic acid suspension. And, consequently, the economy in the amount of phosphor required for an optimum coating thickness is less with the anhydride than with the acid.

We claim:

1. A phosphor coating suspension comprising: a phosphor dispersed in a liquid vehicle, said vehicle comprising a binder and a solvent; an amine dispersant aiding in suspending said phosphor; and a small quantity of benzoic acid or benzoic acid anhydride.

2. The suspension of claim 1 wherein the weight percent of said benzoic acid is about equal to the weight percent of said amine.

3. The suspension of claim 1 wherein said dispersant is an aliphatic amine.

4. The suspension of claim 1 wherein the weight of said amine dispersant is less than 2 percent of the weight of said phosphor.

5. In the manufacture of a fluorescent lamp, the steps which comprise: preparing a suspension including a phosphor, an amine dispersant, benzoic acid and a solvent; coating the inner wall of an open ended lamp bulb with said suspension; evaporating said solvent from said coating; firing said coated bulb at an elevated temperature to burn off the organic materials in said coating; and processing said coated bulb into a finished fluorescent lamp.

6. The process of claim 5 including the step of premixing said amine and said benzoic acid prior to the addition thereof to said suspension.

7. The process of claim 5 wherein the weight percent of said amine based on the weight of said phosphor is about equal to the weight percent of said benzoic acid.

* * * * *